United States Patent [19]

Chevallier

[11] Patent Number: 4,540,770
[45] Date of Patent: Sep. 10, 1985

[54] POLYSTYRYLPYRIDINE RESINS HAVING AN INCREASED TOUGHNESS, AND COMPOSITE MATERIALS COMPRISING THESE RESINS

[75] Inventor: Sammy Chevallier, Paris, France

[73] Assignees: Societe Nationale des Poudres et Explosifs, Paris; Office National d'Etudes et de Recherches Aerospatiales, Chatillon, both of France

[21] Appl. No.: 643,651

[22] Filed: Aug. 23, 1984

[30] Foreign Application Priority Data

Sep. 12, 1983 [FR] France ............................... 83 14487

[51] Int. Cl.³ .............................................. C08G 12/02
[52] U.S. Cl. ................................... 528/248; 528/232;
528/243; 528/246; 528/249; 528/266; 528/269
[58] Field of Search ............... 528/232, 243, 246, 248,
528/249, 266, 269

[56] References Cited

U.S. PATENT DOCUMENTS 4,362,860 12/1982 Ratto et al. ..................... 528/248
4,471,107 9/1984 Peake ............................... 528/248
4,500,690 2/1985 Latulip ............................. 525/502

Primary Examiner—Lucille M. Phynes
Attorney, Agent, or Firm—Bucknam and Archer

[57] ABSTRACT

The present invention relates to polystyrylpyridine-type resins having increased toughness, and composite materials containing these resins.

The resin of the invention contains a polycondensation product of at least two reactive methylated substituents, the said resin having the following general formula (I):
$U_x V_y W_z$ in which:

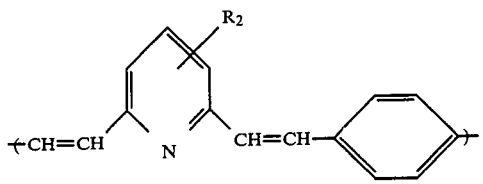

U denotes the grouping

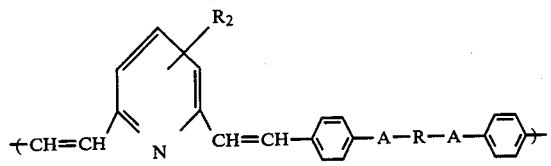

V denotes the grouping

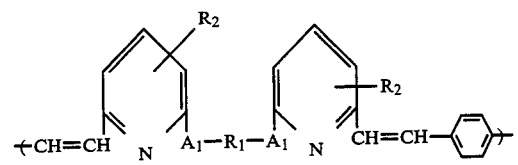

W denotes the grouping in which:
R, $R_1$ are identical or different and denote a chain segment consisting of hydrocarbon radicals and able to contain hetero atoms,
A, $A_1$ are identical or different and denote an atom or group forming a bridge between the segment R and an aromatic nucleus of the styrylpyridine chain, containing stereomobile bonds,
$R_2$ denotes hydrogen, or a methyl or ethyl radical, x, y, z denote integers that may be equal to 0, the sum y+z being at least equal to 1.

Advantageously, A, $A_1$ denotes an oxygen atom. The resins of the invention have better mechanical properties than conventional polystyrylpyridine (PSP) resins, particularly at ambient temperature, yet preserve the excellent thermostability and moisture resistance properties characteristic of PSP resins. This resin may be used as matrix in a laminate.

19 Claims, No Drawings

POLYSTYRYLPYRIDINE RESINS HAVING AN INCREASED TOUGHNESS, AND COMPOSITE MATERIALS COMPRISING THESE RESINS

The present invention relates to resins containing a polycondensation product of at least one aromatic dialdehyde derivative with at least one pyridine derivative containing at least two reactive methylated substituents, these resins generally being called polystyrlylpyridine resins or PSP resins.

The object of the invention are more particularly polystyrylpyridine resins having a modified structure in order to improve the mechanical properties of these resins, particularly at ambient temperature, while preserving the thermostability and moisture resistance properties of unmodified polystyrylpyridine resins.

French Patent Specification Nos. 2 261 296 and 2 378 052 describe processes for preparing polystyrylpyridine resins by polycondensation of aromatic dialdehydes such as terephthalic aldehyde with methylated derivatives of pyridine such as collidine, in particular industrial collidine.

These resins are useful since they have an excellent thermostability and moisture resistance.

Thus, as mentioned in the articles by Bloch and Ropars, "PSP resins, new thermosetting binder for advanced composites", 23rd National SAMPE Symposium, ANAHEIN, May 1978) and by Malassine B. (PSP 6022 resin: a matrix for thermostable fire-resistant, high performance composite materials, ICCH 3-JNC Paris, August 1980), these resins are used as a matrix in composite materials, the resulting materials having good mechanical properties.

Nevertheless, although the composite materials and in particular the laminates obtained with carbon fabrics and a PSP resin have good mechanical properties (flexibility, shear resistance) at high temperatures (250° C.) and during the course of ageing, they have poor properties at moderate temperatures and in particular at ambient temperature.

These poor mechanical properties at moderate temperatures may be explained by the fact that the PSP resin forms, after cross-linking, a matrix that is too rigid and which is therefore liable to break at ambient temperature. This fragility produces microcracks in the laminate, which tend to propagate and promote the oxidation and degradation of the resin.

The object of the present invention is to remedy these disadvantages by providing a polystyrylpyridine-type resin comprising a chain that has been modified by incorporating segments containing points of flexibility. This flexibility of the chain enables the matrix to become "supple" after cross-linking of the resin and thus reduces its fragility.

To this purpose the invention proposes a resin, hereinafter called polystyrylpyridine resin, containing a polycondensation product of at least two reactive methylated substituents, the said resin having the following general formula I;

$$U_x V_y W_z \qquad (I)$$

in which:
U denotes the grouping:

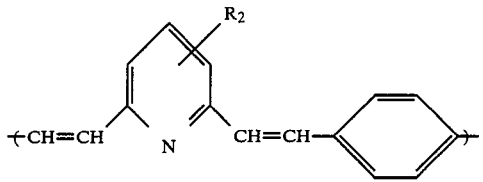

V denotes the grouping:

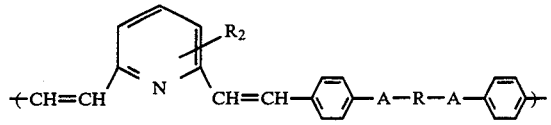

W denotes the grouping:

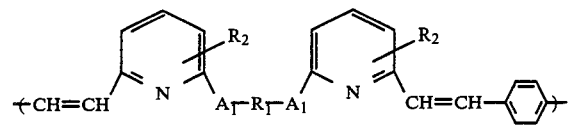

in which:
R, $R_1$ are identical or different and denote a chain segment consisting of hydrocarbon radicals and may contain hetero atoms;
A, $A_1$ are identical or different and denote an atom or group forming a bridge between the segment R, $R_1$ and an aromatic nucleus of the styrylpyridine chain, containing stereomobile bonds,
$R_2$ denotes hydrogen, or a methyl or ethyl radical,
x, y, z denote integers that may be equal to 0, the sum y+z being at least equal to 1.

The term "bridge containing stereomobile bonds" or "stereomobile bond bridge" is understood to mean an arrangement formed by an atom or a group (A, $A_1$) incorporated in a chain, enabling the molecular structure around the said arrangement to be varied, depending on the environment of the chain or under the effect of excitation.

In one of the preferred embodiments of the invention the stereomobile bond bridge is a —O— ether bridge, the symbols A, $A_1$ denoting an oxygen atom.

According to another characteristic of the invention the segments R, $R_1$ are groups consisting of hydrocarbon radicals which, in order that they do not or do not substantially affect the inherent properties of the polystyrylpyridine resins, should have a good thermostability and moisture resistance.

Thus, the segments R, $R_1$ denote either a saturated aliphatic hydrocarbon group, substituted or not, whose main chain contains 1 to 10 carbon atoms, or a group consisting of hydrocarbon radicals joined to one another by hetero atoms also forming a "stereomobile bond bridge" between two parts of the said segment, such as, for example, an ether bridge, an sulphone bridge, or the like.

The segments R, $R_1$, which may be identical or different, are chosen from the group of compounds having the following formulae:
(a) —$CH_2$—$_n$  n being an integer between 1 and 10
(b) —$CH_2$—$CH_2$—O—$_m$$CH_2$—$CH_2$—  m being an integer between 1 and 5.

(c) 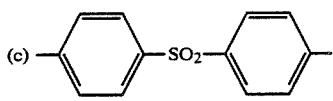

The segments of formula a, b may also contain substituents, for example methyl radicals, on the methylidene (—CH$_2$—) groups of the chain. However, these substituents should not substantially reduce the thermostability and the moisture resistance of the segment R, R$_1$. In order to obtain the resins of the invention, the segments R, R$_1$ and the bridges —A—, —A$_1$— are incorporated either in an aromatic dialdehyde derivative or in a pyridine derivative, or in both, these derivatives being condensed with one another or with an unmodified aromatic aldehyde derivative, such as for example terephthalic aldehyde, or a methylated pyridine derivative, such as for example collidine.

The modified aromatic dialdehyde derivative has, according to the invention, the following general formula II:

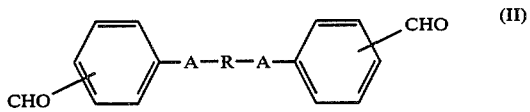 (II)

where A, R have the afore-described meanings.

The pyridine derivative has, according to the invention, the following general formula III:

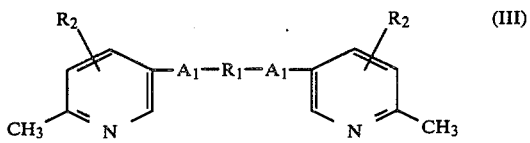 (III)

where A$_1$, R$_1$, R$_2$ have the afore-described meanings.

In the preferred embodiment of the invention, a mixture of aromatic dialdehyde derivatives containing at least one modified dialdehyde of formula (II) is used, preferably at a molar concentration of this modified dialdehyde of less than 50%. This modified dialdehyde will advantageously be used mixed with terephthalic aldehyde.

The modified pyridine derivative of formula III will be used in an identical manner, preferably mixed with one or more pyridine derivatives, particularly with pyridine derivatives such as collidine, the molar concentration of the pyridine derivative of the formula III in the mixture advantageously being less than 50%.

The examples given below purely by way of illustration clearly describe the invention as well as the processes for producing the resins of the invention and their properties and uses.

The modified dialdehydes of formula II and the modified pyridine derivatives of formula III may be prepared by similar processes.

Preparation processes, particularly for dialdehydes, have been described by numerous authors, and for example by R. Jaunin; J. Magnenat (Helv. Chim. Acta 42 328–34; 1959); B. Hugh, Donahoe and al (J. Org. Chem. 26, 474–476; 1961) and J. P. William, Neish (Rec. Trav. Chim. 66, 433–442; 1947).

These dialdehydes are obtained by condensing the sodium or potassium salt of hydroxybenzaldehyde with a dihalide of the general formula IV

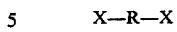 (IV)

in which X denotes a halogen atom and R has the meaning given above.

Similarly, the pyridine derivatives of formula III are obtained by condensing the sodium or potassium salt of a hydroxymethylpyridine with a dihalide of the general formula V

 (V)

in which X and R$_1$ have the meanings given above.

The preparation of polymethylene dioxydibenzaldehyde according to the process published by Jaunin will be described hereinbelow by way of example.

This compound is obtained by adding, over one hour, 1 mole of dihalide of formula IV, for example a dibromoalkyl, to 2 moles of sodium or potassium formylphenate, in the presence of 800 cm$^3$ of DMF as solvent. The sodium or potassium formylphenate may be obtained by the process described by Greber (Makromol. Chem. 154 to 157, 1956).

The reaction medium is heated under reflux during the addition of the alkyl dihalide.

After two hours' heating under reflux, and stirring, the mixture is cooled and then poured into 5 liters of iced water. The polymethylene dioxydibenzaldehyde is separated from the aqueous medium and forms an oily phase which crystallises out. It has been found that the crystallisation of the dialdehyde is more or less quick depending on the nature of the segment R.

The dialdehyde is then purified by recrystallisation in an alcohol such as ethanol or isopropanol.

Dioxyaldehydes of the following general formula

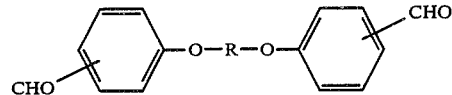

with R corresponding to —CH$_2$—; —(CH$_2$)—$_3$; —(CH$_2$)—$_6$; —CH$_2$—CH$_2$—O—CH$_2$—CH$_2$; and —CH$_2$—CH$_2$—O—$_2$CH$_2$—CH$_2$; the —CHO radicals being either in the para or ortho position, have thus been prepared.

These compounds are identified by NMR and IR spectroscopy, and by measuring their melting point, for example by means of a thermal analyser.

A process for producing resins of the invention will now be described by way of example. This process is similar to that used to synthesize known polystyrylpyridine resins obtained by polycondensation of terephthalic aldehyde with a methylated pyridine derivative such as collidine. This process is described in French Pat. Nos. 2 261 296 and 2 378 052 mentioned above.

In order to obtain the resins of the invention, terephthalic aldehyde is replaced completely or partially by an equivalent molar amount of the aromatic dialdehyde derivative of formula II and/or collidine is replaced by an equivalent molar amount of the pyridine derivative of formula III.

In order to illustrate the process of the invention, some examples of producing polystyrylpyridine resins obtained by condensing collidine with mixtures of dialdehyde consisting of terephthalic aldehyde and a dialdehyde of formula II will be given hereinafter. These examples are purely indicative and are in no way limiting.

Examples 1 to 13

In these examples the mixture of dialdehydes contains a terephthalic aldehyde and an aldehyde of formula II in a quick distillation of excess reactants, under a slight vacuum (about 10 to 15 minutes' distillation).

Several resins have been prepared according to this process, by varying the formulation of the mixture of aromatic dialdehydes, the nature of the dialdehyde of formula II, and the catalyst, and by using p-toluenesulphonic acid (PTSA) in place of $H_2SO_4$. The formulations of these different resins are given in Table 1 hereinafter.

TABLE 1

Preparation of the resins of the invention

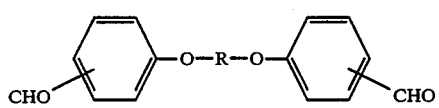

| Examples | n | Position of —CHO | number of moles | Terephthalic aldehyde number of moles | Collidine (g) | Reaction time (50% completion) | Yield % |
|---|---|---|---|---|---|---|---|
| 1 (1) | 1 | O | 0,16 | 0,5 | 90 | 1H 30 | 78,7 |
| 2 (1) | 1 | O | 0,3 | 0,3 | 83,1 | 1H 45 | 77 |
| 3 (1) | 1 | O | 0,5 | — | 70,2 | 2H 15 | 77,8 |
| 4 (1) | 1 | P | 0,16 | 0,5 | 90 | 1H 30 | 72,4 |
| 5 (1) | 1 | P | 0,3 | 0,3 | 83,1 | 1H 30 | 72,4 |
| 6 (1) | 3 | O | 0,16 | 0,49 | 90 | 2H 15 | 81,5 |
| 7 (1) | 3 | O | 0,29 | 0,29 | 79,7 | 3H 30 | 84,6 |
| 8 (2) | 3 | O | 0,47 | — | 65,6 | 4H | 84 |
| 9 (2) | 3 | P | 0,16 | 0,49 | 90 | 6H 30 | 79,7 |
| 10 (2) | 3 | P | 0,32 | 0,32 | 90 | 10H | 79,7 |
| 11 (1) | 3 | P | 0,32 | 0,32 | 90 | 3H | 75,8 |
| 12 (1) | 6 | O | 0,25 | 0,75 | 139 | 2H 40 | 85,6 |
| 13 (1) | 6 | O | 0,50 | 0,50 | 139 | 3H 10 | 87,8 |

(1) The catalyst is $H_2SO_4$
(2) The catalyst is PTSA
O, P denote the ortho and para position respectively which R denotes the group $-CH_2-_n$ where n is equal to 1, 3 or 6. The detailed process, given below, is carried out with a mixture of 75 mole % of terephthalic dialdehyde and 25 mole % of diformyl-2,2'-diphenoxypropane.

111 g of the mixture of dialdehydes (46 g or 0.162 mole of diformyl-2,2'-diphenoxypropane and 65 g or 0.485 mole of terephthalic aldehyde) is mixed with 90 g of technical collidine containing 72 mole % of trimethyl-2,4,6-pyridine and 3 g or 0.03 mole of sulphuric acid as catalyst, in a thermostatically controlled reactor provided with a stirrer, a thermometer, and a Dean and Stark apparatus surmounted by a reflux condenser.

The polycondensation reaction is carried out at 180° C., the course of the reaction being monitored by measuring the volume of water recovered in the Dean and Stark apparatus.

When the volume of recovered water reaches 11.7 cm³, which corresponds to a 50% degree of completion of the condensation reaction, the reaction is stopped by

EXAMPLES 14 TO 17

The resins are produced according to the same process as described in Examples 1 to 13. However, the mixture of aromatic dialdehydes consists of terephthalic aldehyde and an aldehyde of formula II in which R denotes the group $-CH_2-CH_2-O-_mCH_2-CH_2-$ where m is equal to 1 or 2.

In an identical manner to Examples 1 to 13, several resins are made by modifying the formulation of the mixture of aromatic dialdehydes. The formulations of these different resins are given in Table 2 below.

TABLE 2

Preparation of the resins of the invention

R: $-(CH_2-CH_2-O)_m-CH_2-CH_2-$

| Example (1) | m | Position of —CHO | Number of moles | Terephthalic aldehyde Number of moles | Collidine (g) | Reaction time (50% completion) | Yield % |
|---|---|---|---|---|---|---|---|
| 14 | 1 | Ortho | 0,25 | 0,75 | 139 | 1H 55 | 85,7 |
| 15 | 1 | Ortho | 0,50 | 0,50 | 139 | 4H 00 | 80,6 |
| 16 | 2 | Ortho | 0,25 | 0,75 | 139 | 3H 35 | 85,6 |
| 17 | 2 | Ortho | 0,50 | 0,50 | 139 | 4H 45 | 88,3 |

(1) The catalyst is $H_2SO_4$.

The resins prepared in Examples 1 to 17 were next cross-linked by heating in a ventilated oven for 4 hours at 200° C., and were then cured for 4 hours at 255° C.

The thermostability of the cross-linked resins was evaluated on the one hand by thermogravimetry in air and in a nitrogen atmosphere, and on the other hand by measuring the weight loss of samples of cross-linked resin subjected to accelerated ageing at 255° C.

The results obtained are shown in Tables 3a and 3b hereinafter.

TABLE 3a

Thermostability of the resins of the invention

| Examples Nos. (3) | % weight loss at 350° C. (thermogravimetry) (1) in nitrogen | in air | % weight loss (2) of test specimens at 255° C. after 500 hrs. | after 1000 hrs. |
|---|---|---|---|---|
| 1 | 7 | 8,3 | 1,78 | 3,6 |
| 2 | 8 | 10,5 | 3,16 | 8 |
| 3 | 15 | 16,4 | — | — |
| 4 | 6 | 5,6 | — | — |
| 5 | 9 | 10,5 | 3,46 | — |
| 6 | 6 | 6,2 | 2,05 | 5 |
| 7 | 9 | 10 | 2,74 | — |
| 8 | 10 | 8 | 2,57 | 8 |
| 9 | 7 | 7,3 | 1,96 | — |
| 10 | 7 | 8,6 | 2,59 | — |
| 11 | 9 | 7,2 | 2,86 | 8 |
| T (4) | | | 0,8 | 1,6 |

(1) Thermogravimetric measurements on 200 mg of resin during heating from 20° to 650° C. at a heating rate of about 5° C./minute.
(2) Measurements carried out on test samples of pure resin obtained by moulding at 200° C. for 8 hours followed by post-curing for 17 hours at 250° C.
(3) The reference numbers correspond to the numbers given in Tables 1 and 2.
(4) Unmodified polystyrylpyridine resin obtained by polycondensation of terephthalic aldehyde with collidine.

TABLE 3b

Thermostability of the resins of Examples 12 to 17

| Example | % weight loss at 350° C. (1) in air |
|---|---|
| 12 | 7.8 |
| 13 | 5 |
| 14 | 7.2 |
| 15 | 12.4 |
| 16 | 11.3 |
| 17 | 14.2 |

(1) Thermogravimetric measurements on 200 mg of resin during the course of heating from 20° to 650° C. at a heating rate of about 5° C./minute.

These measurements show that the thermostability of the resins modified by incorporating a —O—($CH_2$)$_n$—O— or —O—$CH_2$—$CH_2$—O—$_m$—$CH_2$—$CH_2$—O— segment is slightly less than that of the unmodified polystyrylpyridine resin (T), this reduction in thermostability being more marked the greater the proportion of modified aromatic dialdehydes in the mixture of dialdehydes.

Nevertheless, this thermostability is still of an acceptable level.

These resins have also been tested as impregnation resin for producing composite materials such as laminates with carbon fabric, glass fabric or the like.

In order to form these laminates the resin was first of all dissolved in a solvent such as methyl ethyl ketone or dichloromethane, in order to obtain a solution having a suitable viscosity for the impregnation of a fabric, for example a carbon fabric, identification No. 40 830 marketed by Messrs. Stevens Genin (fabric with 340 g of Toray T 300 carbon fibres per square meter). Laminate plates about 2 mm thick are made by stacking 7 plies of pre-impregnated material and press moulding for 8 hours under a pressure of 10 bars at a temperature of 200° C.

In order to evaluate the mechanical properties of each plate thus obtained, and more particularly the fragility of these plates at high temperature and at ambient temperature, the behaviour of the laminates under flexural and shearing forces was studied by measuring in particular the interlaminar shear resistance $\sigma_c$ at a temperature of 20° and 250° C. respectively.

These mechanical properties were evaluated on the laminate before a post-curing (PC) and after a post-curing of 16 hours at 250° C. The results are given in Table 4 below.

TABLE 4

| Resin of Example No. | Interlaminar shear resistance | | |
|---|---|---|---|
| | $\sigma_c$ at 20° C. before PC (MPa) | $\sigma_c$ at 20° C. after PC (MPa) | $\sigma_c$ at 250° C. after PC (MPa) |
| 6 (2) | 69–63 | 48 | 37 |
| 7 | 65 | 46 | 34 |
| 6 (2) | 63 | 42 | 41 |
| 13 | 62 | 45 | 17 |
| 14 | 64 | 35 | 37 |
| 15 | 64 | 35 | 39 |
| 16 | 56 | 32 | 35 |
| 17 | 65 | 39 | 22 |
| T (1) | 55 | 35 | 37 |

(1): test carried out with PSP resin obtained by poly-condensation of terephthalic aldehyde with collidine
(2): two different laminates formed with a formulation resin corresponding to that given in Table 1, Example 6.

From this Table it appears that the unmodified PSP resin (test T) has mechanical properties at ambient temperature (20° C.) which are worse than those at elevated temperature (250° C.). In contrast, the laminates having a modified PSP as matrix in accordance with the invention have mechanical properties at elevated temperatures that are substantially of the same order as those of a laminate having an unmodified PSP matrix, while these mechanical properties are preserved at ambient temperature.

Thus, it has been found from numerous measurements that the interlaminar shear resistance of a laminate having an unmodified PSP resin as matrix is between about 34 and 37 MPa at 250° C., and between about 32 and 35 MPa at 20° C., whereas in the case of a laminate having a resin matrix according to the invention this interlaminar shear resistance is between about 37 and 43 MPa at 250° C., and between about 45 and 55 MPa at 20° C.

Moreover, the resins of the invention preserve their mechanical properties during ageing.

In addition, the thermostability measurements of these laminates made by measuring the weight loss and shear resistance loss at high temperatures (200° C. and 250° C.) have shown that these resins preserve their mechanical properties and exhibit only a slight weight loss after ageing at 200° C. for several thousands of hours, or after ageing at 250° C. for several hundreds of hours.

The resins of the invention thus preserve the important thermostability and moisture resistance properties of the polystyrylpyridine resins based on terephthalic aldehyde and methylated pyridine, but exhibit better mechanical properties, in particular at ambient temperature.

These resins are thus ideally suitable for forming the matrix of a composite material such as a laminate.

I claim:

1. Resin containing a polymerisation product of at least one aromatic dialdehyde derivative with at least one pyridine derivative containing at least two reactive methylated substituents, wherein the said resin has the following general formula (I):

$U_xV_yW_z$ in which:

U denotes the grouping

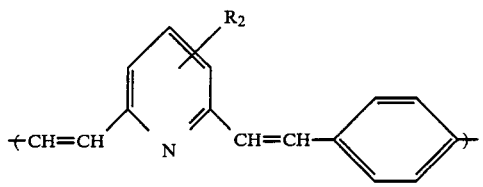

V denotes the grouping

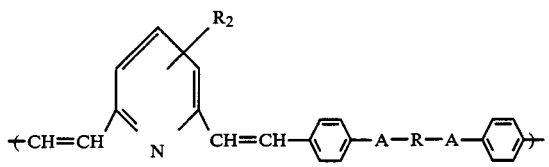

W denotes the grouping

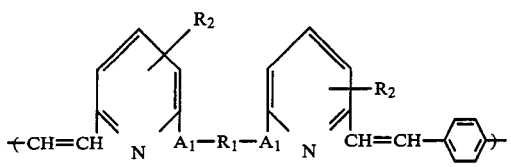

in which:

R, $R_1$ are identical or different and are a chain segment consisting of (a) hydrocarbon radicals (b) hydrocarbon radicals containing hetero atoms, A, $A_1$ are identical or different and denote an atom or group forming a bridge between the segment R and an aromatic nucleus of the styrylpyridine chain, comprising stereomobile bonds, $R_2$ denotes hydrogen, or a methyl or ethyl radical, x, y, z are integers or 0, the sum y+z being at least equal to 1.

2. Resin according to claim 1, wherein A, $A_1$ denote oxygen, the stereomobile bond bridge being an ether bridge.

3. Resin according to claim 1, wherein R, $R_1$ denote a saturated aliphatic hydrocarbon group, substituted or unsubstituted, whose main chain contains 1 to 10 carbon atoms.

4. Resin according to claim 3, wherein R, $R_1$ has the general formula:

wherein n is an integer between 1 and 10.

5. Resin according to claim 1, wherein R, $R_1$ denote a group consisting of hydrocarbon radicals joined to one another by heteroatom forming a stereomobile bond bridge.

6. Resin according to claim 5 wherein the heteroatom is oxygen atom and the stereomobile bond bridge an ether bridge.

7. Resin according to claim 6 wherein R, $R_1$ has the general formula:

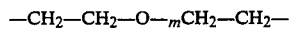

wherein m is an integer between 1 and 5.

8. Resin according to claim 5, wherein the heteroatom is sulfone group and the stereomobile bond bridge is a sulfone bridge.

9. Resin according to claim 20, wherein R, $R_1$ has the general formula:

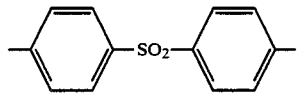

10. Resin according to claim 1, wherein said dialdehyde derivative has the following general formula II:

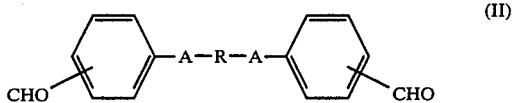

where A and R have the afore-described meanings.

11. Resin according to claim 1, wherein said pyridine derivative has the following formula III:

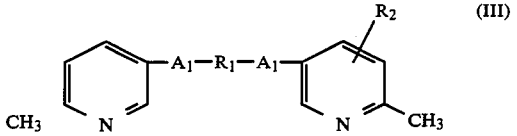

where $A_1$, $R_1$, $R_2$ have the afore-described meanings.

12. Resin according to claim 10, wherein the polycondensation product is obtained from a mixture of dialdehyde derivatives containing at least said derivative of formula (II).

13. Resin according to claim 12, wherein said mixture of dialdehyde derivatives contains at most 50 mole % of dialdehyde derivative of formula II.

14. Resin according to claim 13, wherein said mixture of dialdehyde derivatives contains terephthalic aldehyde.

15. Resin according to claim 11, wherein the polycondensation product is obtained from a mixture of pyridine derivatives containing at least one pyridine derivative of the afore-mentioned formula III.

16. Resin according to claim 15, wherein said mixture of pyridine derivatives includes collidine.

17. Resin according to claim 16, wherein said mixture of pyridine derivatives contains at most 50 mole % of pyridine derivatives of formula III.

18. Composite material comprising a support which is carbon, glass a similar fabric, a mat or fibres, said support being impregnated with a resin, wherein one of the constituents of the said resin is a resin according to claim 1.

19. The composite according to claim 18 which is a laminate.

* * * * *